United States Patent [19]

DeJong

[11] Patent Number: 4,835,131

[45] Date of Patent: May 30, 1989

[54] CATALYST AND PROCESS FOR THE PREPARATION OF THE CATALYST

[75] Inventor: Krijn P. DeJong, Amsterdam, Netherlands

[73] Assignee: Shell Oil Company, Houston, Tex.

[21] Appl. No.: 80,128

[22] Filed: Jul. 31, 1987

[30] Foreign Application Priority Data

Aug. 29, 1986 [GB] United Kingdom ............... 8620982

[51] Int. Cl.$^4$ .................. B01J 21/08; B01J 23/28; B01J 32/00
[52] U.S. Cl. ............................................. 502/255
[58] Field of Search ............... 502/255, 333, 346, 77, 502/78, 79, 211, 306, 308, 309, 321, 439

[56] References Cited

U.S. PATENT DOCUMENTS

| | | | |
|---|---|---|---|
| 2,802,794 | 8/1957 | Sprauer | 502/333 |
| 3,567,656 | 3/1971 | Mitsche | 502/333 X |
| 3,816,344 | 6/1974 | Shimizu et al. | 502/333 X |
| 3,931,050 | 1/1976 | Asano et al. | 502/306 X |
| 4,128,506 | 12/1978 | Hegedus et al. | 502/334 X |
| 4,200,552 | 4/1980 | Noguchi et al. | 502/333 X |
| 4,349,462 | 9/1982 | Velenyi et al. | 502/309 X |
| 4,378,308 | 3/1983 | Angelvine et al. | 252/455 R |

FOREIGN PATENT DOCUMENTS

| | | |
|---|---|---|
| 223299 | 5/1987 | European Pat. Off. . |
| 204314 | 10/1988 | European Pat. Off. . |
| 1963827 | 10/1978 | Fed. Rep. of Germany . |
| 2639342 | 4/1980 | Fed. Rep. of Germany . |
| 2089784 | 7/1972 | France . |
| 2338076 | 12/1977 | France . |

*Primary Examiner*—W. J. Shine
*Attorney, Agent, or Firm*—Y. Grace Tsang

[57] ABSTRACT

A process for the preparation of a metal-containing supported catalyst, having at least one metal or metal compound substantially present in a selected part thereof comprising contacting a aqueous solution of an appropriate metal compound with a reagent capable of changing the valency of said metal during contact with a preshaped support.

The resulting catalyst, which may have an egg-shell or an egg-yolk type distribution for the catalytically active component, may be used e.g. in diffusion limited processes as well as in processes wherein the feedstock may contain catalyst poisons, e.g. in residue conversion.

8 Claims, 3 Drawing Sheets

CATALYST AND PROCESS FOR THE PREPARATION OF THE CATALYST

FIELD OF THE INVENTION

The invention relates to a process for the preparation of metal-containing supported catalysts, to catalysts made by said process and to their use. Preferred uses are in residue conversion and selective hydrogenation of acetylene.

BACKGROUND OF THE INVENTION

A problem frequently encountered in catalyzed processes is the relatively short life of the catalysts, e.g. in hydrotreating processes especially when employing heavy feedstocks such as residua. In such a process the relatively high concentrations of asphaltenes and/or asphaltic components normally present in such feedstocks, tend to result in excessive coke formation and deposition thereof on the catalyst, thereby reducing the active catalyst surface and hence the overall catalytic activity.

In recent years a considerable effort has been spent on finding ways and means of extending the catalyst life, especially because of the increasing tendency to use heavier feedstocks.

A proposal towards solving the problem of reduced catalyst life as a result of coke and/or metal deposition on the catalyst, has been described in U.S. Patent Specification No. 4,378,308, filed Mar. 29, 1983, and comprises coating the catalyst surface with a hydrated clay mineral, hydrated alumina, hydrated silica or mixtures thereof. It is postulated that such a coating, which generally has a smaller pore size than the original catalyst, protects the catalyst by inhibiting the diffusion of catalyst poisons to the active sites. A thus prepared catalyst can be considered to be a catalyst having a non-uniform distribution of the active component i.e. a catalyst comprising a relatively large core containing all the active component, covered by an active component-free outer shell.

Although the thus prepared catalysts are likely to be less sensitive to contamination by certain feedstock components or derivatives thereof, they still possess a number of inherent disadvantages. For instance they will suffer from adhesion problems at the interface of the coating and the original catalyst, which will reduce the overall mechanical strength of the coated catalyst. Furthermore, the mechanical strength of the coating as such may be inferior to that of the original catalyst and may thus give rise to excessive attrition. By coating an existing catalyst it will be very difficult to maintain the original shape of the catalyst, which may be especially critical in the case of spherically shaped catalysts or catalysts based on carriers having a very specific shape such as trilobes and rings. Finally the actual coating of an existing catalyst introduces an additional preparation step.

Hence it will be clear that there is room for improvement in the preparation of catalysts for use in processes wherein catalyst contamination and/or poisoning is likely to occur.

It is now proposed to prepare metal-containing supported catalysts by a single step process wherein the combination of process conditions and nature of the reactants will determine the ultimate distribution of the metal or metal compound over the support. This process results in supported catalysts which do not suffer from the inherent disadvantages of the catalysts referred to hereinbefore.

SUMMARY OF THE INVENTION

The invention provides a process for the preparation of a metal-containing supported catalyst, having at least one metal or metal compound substantially present in a selected part thereof. The process of the invention comprises contacting an aqueous solution of an appropriate metal compound with a reagent capable of changing the valency of said metal during contact with a preshaped support. The invention further includes catalysts prepared by the above process and their use in processes wherein catalyst poisoning is likely to occur or in diffusion limited process, particularly in residue conversion and selective hydrogenation of acetylene.

DETAILED DESCRIPTION OF THE INVENTION

Figure 1:
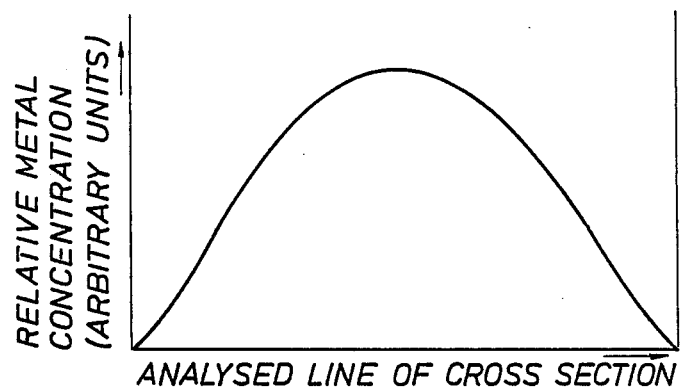
FIG. 1 and FIG. 2 are illustrative plots of the metal distribution in a spherical catalyst having respectively an egg-yolk or an egg-shell metals distribution.

It is extremely surprising that in the process according to the present invention it is not only possible to prepare metal supported catalysts, wherein at least a metal or metal compound is present in a selected part of the catalyst, i.e. catalysts having an inhomogeneous but non-random distribution of the metal or metal compound over the catalyst, but moreover that by changing the nature of the reactants it is also possible to vary said selected part of the catalyst, as will be discussed hereinafter.

It should be noted that metal containing supported catalysts prepared by methods based on the conventional impregnation technique or based on a precipitation deposition in the presence of a hydroxyl ions-generating compound will generally have a more or less homogeneous distribution of the catalytically active compound on the support. In analogy herewith it would have been expected that a similar distribution would have been obtained when applying the hereinbefore mentioned precipitation deposition in the presence of a reducing agent to a preshaped carrier.

The use of the precipitation deposition method in the presence of a reducing agent is known from British Patent Specification No. 1,282,138 published July 19, 1972. In said document a method for the preparation of metal supported catalysts is described wherein a reducing agent is contacted with an aqueous solution of a salt of a catalytically active element, and wherein a powdered carrier material has been suspended under conditions which result in a precipitation of a compound of said catalytically active element exclusively on the suspended carrier material.

The metal compounds which may be employed in the process according to the present invention are water-soluble metal compounds based on catalytically active metals which are capable of participating in redox reactions in an aqueous medium, i.e. compounds based on metals which can occur in more than one valency in such an aqueous medium. Although probably most metals, with the exception of the alkali metals and the alkaline earth metals can occur in more than one valency under these circumstances, there is a preference for metals of groups Ib, VIb, VIIb and VIII of the periodic system, such as Ag, Cu, Mo, W, Re, Mn, Fe, Co, Ni, Rh, Pd and Pt. In the present process the changing of the metal valency of the metal in the starting compound results in a metal compound having a much lower solubility in the aqueous medium than the starting compound, and which compound is preferably insoluble in the reaction medium. The water-soluble compounds include both species wherein the metal composes the cation of said compound, as well as those wherein the metal is present in the anion of said compound, i.e. the metal forms part of a coordinate anion group such as a coordinate anion group based on an oxyacid or halometallic acid of said metal. It is also possible that the metal is present as a complex cation such as an amine complex.

Reagents capable of changing the valency of the metal of the metal compounds which may be employed in the process of the present invention include both reducing an oxidizing agents and are preferably metal-free compounds and are preferably water-soluble. Suitable reducing agents include organic reducing agents such as aldehydes, monosaccharides such as aldoses and ketoses, bisaccharides such as maltose, lactose and dextrose, alcohols, polyphenols such as resorcinol, pyrogallol, hydroquinone or derivatives thereof. Nitrogen compounds such as hydrazine and hydroxylamine or derivatives thereof may also be employed as reducing agents, especially in systems requiring strong reducing agents. Suitable water-soluble oxidizing agents include hydrogen peroxide, nitrate ions, perchlorate ions and the like. It is also conceivable that the valency of the metal in the metal compound in the process of the present invention can be changed in the presence of a gaseous oxidizing agent such as $O_2$, $O_3$ and $Cl_2$ or a reducing agent such as $H_2$.

Contacting the aqueous solution of the metal compound with a reagent capable of changing the valency of said metal is generally sufficient to initiate the metal valency-changing reaction hereinafter referred to as a redox reaction. The overall net results of such a redox reaction will be that in addition to the formation of a metal compound wherein the valency of the metal is different to that of the starting metal compound, hydrogen ions or hydroxyl ions are generated. This generation of hydrogen or hydroxyl ions makes it possible to influence the reaction rate of the redox reaction by changing the pH of the reaction medium. In this case of hydrogen ion-generating redox reaction, increasing the pH (e.g. addition of hydroxyl ions) will increase the reaction rate, while lowering the pH (e.g. addition of hydrogen ions) will decrease the reaction rate. With a hydroxyl ion-generating redox reaction the reverse will apply, i.e. increasing or lowering pH will decrease, respectively increase the reaction rate.

A preshaped support which is acidic or basic vis-a-vis the aqueous mixture is understood to be a support having an iso electric point (IEP) which is lower, when the support is acidic, or higher, when the support is basic than the pH of the aqueous reaction mixture. The IEP of a support material can be determined by numerous known methods such as electrophoresis.

By contacting the aqueous reaction mixture containing the metal compound and the agent capable of changing the valency of said metal with a preshaped support it will also be possible, in analogy to what was stated hereinbefore, to influence the rate of the redox reaction by selecting a support having an IEP (sufficiently) different to the pH of the aqueous reaction mixture.

As mentioned hereinbefore the metal or metal compound is distributed inhomogeneously but non-randomly over the catalyst. More specifically, two modes of distribution can be obtained by the process of the present invention. The first is a catalyst wherein the outer surface and shell or outer layer of the catalyst is substantially free of catalytically active metal or metal compound, or wherein at least the concentration of the metal or metal compound in the shell or outer layer is considerably lower than in the inner parts, i.e. the inner portion, and especially the center of the catalyst. Said mode of distribution will hereinafter be referred to as egg-yolk distribution. The second mode of distribution is one wherein substantially all the catalytically active metal or metal compound is present on the surface and/or in the shell or outer layer of the catalyst or alternatively a catalyst wherein the concentration of metal or metal compound in the inner parts, i.e. the inner portion, and especially in the center of the catalyst is considerably lower than on the surface and/or in the shell or outer layer of the catalyst. Said mode of distribution will be referred to hereinafter as egg-shell distribution.

By the process according to the present invention it is possible by selecting an appropriate combination of metal compound, redox reaction and type of support, to prepare catalysts having either an egg-yolk or egg-shell distribution of the catalytically active metal or metal compound. Combinations which favor the formation of the egg-yolk distribution comprise:
  a hydroxyl ion-generating redox reaction with an acidic reacting support, and
  a hydrogen ion-generating redox reaction with a basic reaction support.

Combinations which favor the formation of an egg-shell distribution comprise:
  a hydroxyl ion-generating redox reaction with a basic reacting support, and
  a hydrogen ion-generating redox reaction with an acidic reacting support.

Since each of these hydroxyl ion- or hydrogen ion-generating redox reactions can be carried out in the presence of an oxidizing or a reducing agent, the number of possible combinations to arrive at an egg-yolk or an egg-shell distribution is doubled.

The rate at which the inhomogeneous deposition occurs can be influenced by lowering the concentration in the aqueous mixture of one or more of the reactants, lowering the reaction temperature, which operations will both reduce the rate of deposition and also by increasing the difference between the IEP of the support and the pH of the aqueous reaction mixture.

In situations wherein the difference between the pH of the aqueous reaction mixture and the IEP of the support is insufficient and cannot be increased by the addition of an acid or base, e.g. in systems wherein as a result of such an addition the support would tend to dissolve, it may be useful to buffer the pH of said mixture. In the case of a high rate of deposition, it might be necessary to allow the redox reaction to progress during only a relatively short time in order to sustain an inhomogeneous distribution of the metal or metal compound. The deposition may terminate spontaneously when the proper reaction conditions have been applied.

The preshaped supports which may be employed in the process of the present invention will generally be based on refractory oxides and include compounds such as $SiO_2$, gamma-$Al_2O_3$, eta-$Al_2O_3$, $ZrO_2$, $Cr_2O_3$, MgO, $TiO_2$, $ThO_2$, and mixtures thereof such as $SiO_2.Al_2O_3$. Furthermore, reaction products of such an oxide and a metal oxide such as a spinel e.g. $MgAl_2O_4$ may also be used. The preshaped supports may also be based on aluminum phosphate or zeolite type materials such as faujasite, mordenite, ZSM-5, ferrierite and the like. The preshaped carriers employed in the process of the present invention may optionally contain one or more catalytically active metal or metal compounds. The actual shape of the support is not very critical as this will generally be determined by the ultimate application of the catalyst to be made, and includes spheres, cylinders, hollow cylinders, rings, trilobes, granules and the like. It is preferred that these porous preshaped supports have a pore volume of at least 0.1 ml/g and a surface area of at least 0.5 $m^2$/g. It may be advantageous to employ preshaped supports which have been submitted to only a relatively mild heat treatment or calcination.

The inhomogeneous but non-random distribution of the catalytically active metalor metal compound in the shaped catalyst prepared by the process according to the present invention was determined with the aid of the Electron-Probe Microanalysis technique. The principle of this technique has been the subject matter of numerous publications such as in "Quantitative Electron-Probe Microanalysis", by V. D. Scott and G. Loved, published by Ellis Harwood Ltd., 1983. Said analysis technique has been used extensively in a wide range of scientific disciplines, including metallurgy, solid phase physics, mineralogy and biology.

Figure 2:
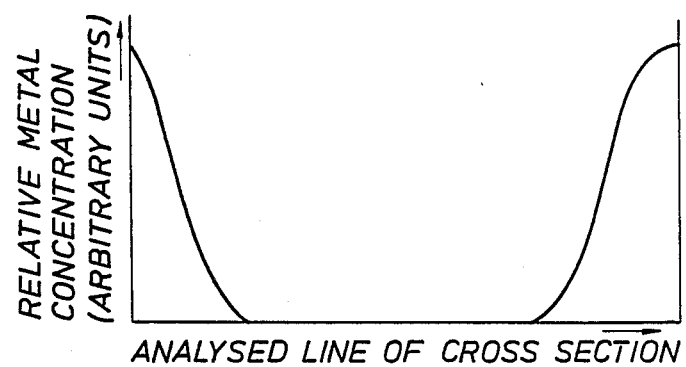

When applied to catalysts prepared by a process according to the present invention, the inhomogeneous metal distribution was determined by measuring the metal concentration, in a cross section of the shaped catalyst, along a line running from one side of the cross section to the opposite side thereof and preferably through the center. Which catalyst cross section is actually employed in this analysis is not critical. It may be advantageous to select a cross section which provides a more or less symmetrical diagram of the metal distribution e.g. a cross section perpendicular to the longest axis of the shaped catalyst, if present. With the more complicated shaped catalysts such as trilobes, rings and saddles, it may not always be possible to select such a cross section. Moreover, it is also possible that the overall cross section of a shaped catalyst may be composed of more than one identical local cross section, such as may be the case with a ring-shaped catalyst. However, even under those circumstances it should pose no problem to select a cross section with the aid of which it is possible to demonstrate the metal distribution of that catalyst. A typical diagram of the metal distribution in a spherical catalyst having an egg-yolk or an egg-shell distribution as defined hereinbefore, and based on Electron-Probe Micro-analysis is shown in FIGS. 1 and 2, respectively.

The catalysts prepared according to the process of the present invention may conveniently be employed in processes wherein it is preferred that the catalytically active component or components of a shaped catalyst is or are present in a selected part of the shaped support. Egg-shell type catalysts maybe be used advantageously in diffusion limited processes, such as in the selective hydrogenation of acetylene employing a Pd on γ-alumina catalyst.

Fields of application for the metal containing supported catalyst having an egg-yolk metal distribution may be found for instance in residue conversion, wherein group VIb meals such as Mo and W on silica or combinations of groups VIII and group VIb metals such as Ni-Mo on silica catalysts may advantageously be employed. Exhaust-gas purification would be another outlet for the use of an egg-yolk type catalyst e.g. Co or promoted Co on silica or Pt-Rh on γ-alumina.

The invention will be further illustrated by means of the following Examples which are provided for illustrative purposes and are not intended to limit the invention. The following materials were used:

Supports:

gamma-alumina extrudate, AC 300: diameter 1.5 mm, length 4–6 mm, pore volume 0.68 ml/g, surface area 250 $m^2$/g, calcined 60 hr. at 500° C.

Silica spheres ex SHELL: diameter 1.5 mm, pore volume 1 ml/g, surface area 260 $m^2$/g.

Granulated silica ex Grace Davison: 0.6–1.4 mm granules, pore volume 1.2 ml/g, surface area 310 $m^2$/g.

Reagents:

$(NH_4)_6Mo_7O_{24}.4H_2O$, ammonium hepta-molybdate (AHM)

$N_2H_5OH$, hydrazine hydrate 80%, ex Merck (zur Synthese)

Acetic acid, ex Baker (analyzed)

$Cu(NO_3)_2.3H_2O$ Copper nitrate ex Mallinckrodt.

$HNO_3$, (65%) ex Baker.

$AgNO_3$, 63.5% Ag, ex Schöne Edelmetaal B.V.

Formaldehyde: aqueous solution stabilized with methanol, 37% $CH_2O$ ex Baker.

Ammonia: concentrated as supplied.

Water: in all examples and at all stages demineralized water was used.

EXAMPLE 1

Preparation of a molybdenum on silica catalyst having an egg-yolk Mo distribution Preparation of Mo-solution 36.8 G of AHM was dissolved in 900 ml water, concentrated ammonia was added until a pH=8.7 had been obtained (Solution I).

Preparation of $N_2H_4$-solution

250 Ml of $N_2H_5OH$ was slowly neutralized with concentrated acetic acid (195 ml) to a pH=8.9. During neutralization, the solution was cooled. 46.1 Ml of the neutralized solution was diluted with water to a volume of 100 ml and cooled to 0° C. (Solution II).

Catalyst preparation

Solution II was added to solution I and the combined volumes were made up to 1300 ml by the addition of water. The resulting solution had a pH=8.8 and contained 15.4 g Mo/l and had a $N_2H_4$/Mo mol ratio=2.3. The temperature of this solution was kept at or below 10° C.

Figure 3:
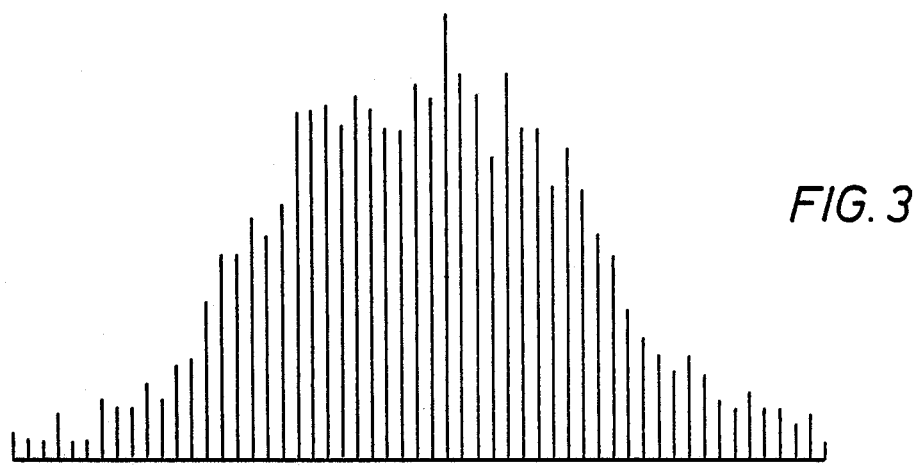
FIG. 3 through FIG. 9 are diagrams of the metal distribution in catalysts prepared by methods in the examples described hereinafter.

The solution was circulated at a rate of 60 ml/min for several hours through a small glass vessel (approx. 60 ml) containing 25 g of silica spheres. The temperature in this vessel was maintained at 30° C. During circulation the formation of a brown deposit within the silica spheres could be observed. The deposition appeared to be discontinued after the first hour of circulation. After separation by filtration, the silica spheres were washed with water and dried at 120° C. in air. By means of X-ray fluorescence (XFR), the catalyst was found to contain 1.5 % w Mo. With the aid of Electron Probe Micro-analysis (EPM), the Mo-distribution was determined as depicted in FIG. 3.

EXAMPLE 2

Figure 4:
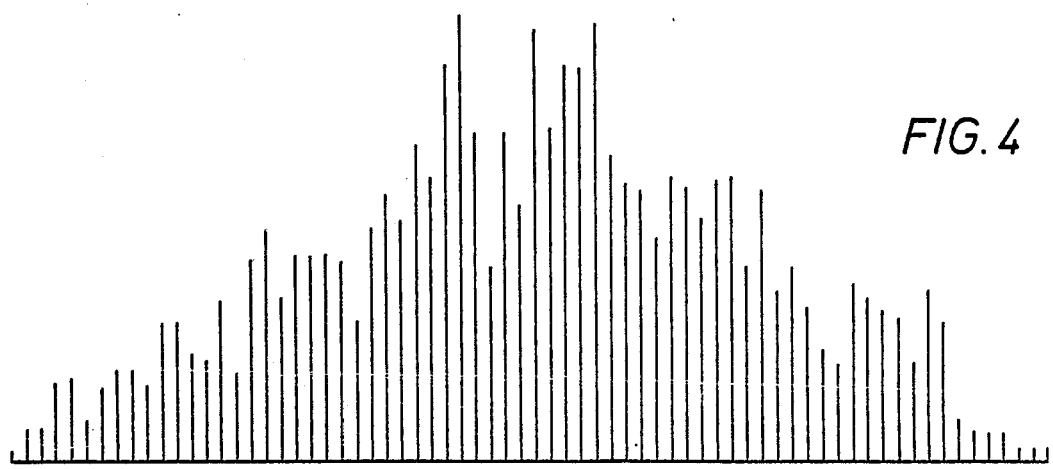

Preparation of a Mo on silica catalyst, having an egg-yolk Mo distribution, via a quenching technique An aqueous $Mo/N_2H_4$ solution, having pH=8.5 and containing 71.9 g Mo/l and a $N_2H_4/Mo$ molar ratio=2, was prepared by the method as outlined in Example 1. 6.7 G of silica spheres were soaked in 40.5 ml of this solution at 0° C. The precipitation deposition reaction started in a few minutes after the addition of the silica spheres, and was allowed to progress for 15 minutes. Subsequently the reaction was quenched by the addition of an excess of water of 0° C. After washing with water and drying at 120° C. in air, XRF indicated the catalyst to have a Mo content of 0.66 % W. With the aid of EPM the Mo-distribution was determined as depicted in FIG. 4.

EXAMPLE 3

Figure 5:
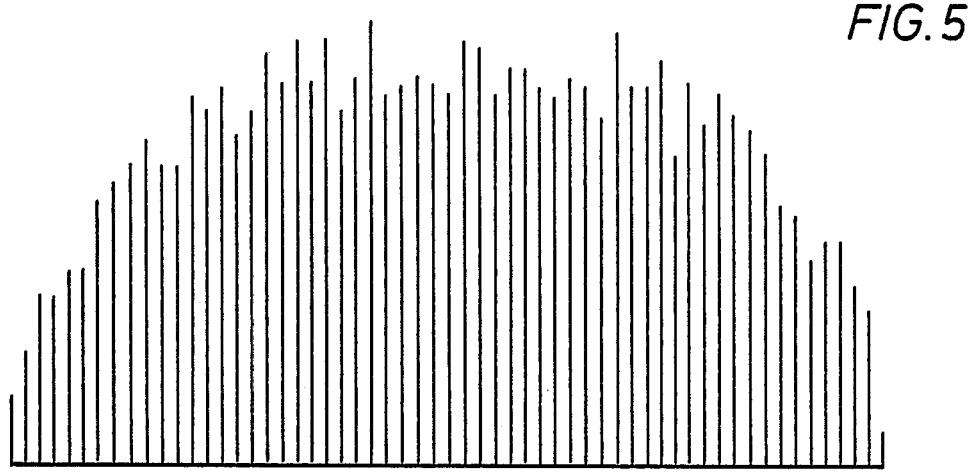

Preparation of a Mo on silica catalyst having an egg-yolk Mo distribution and a higher Mo content than catalyst of Example I The catalyst preparation as described in Example I was repeated with an aqueous $Mo/N_2H_4$ solution having a pH=8.5 and containing 15 g Mo/l and having a $N_2H_4/Mo$ mol ratio=1.1. The temperature of the solution was maintained at 27° C. while the temperature in the vessel containing the silica spheres was kept at 50° C. The $Mo/N_2H_4$ solution was circulated for 20 hrs. Subsequently the silica spheres were separated by filtration, washed with water and dried at 120° C. in the air. XRF indicated the catalyst to have a Mo content=6.7 % w, while the EPM the Mo-distribution was determined as depicted in FIG. 5.

EXAMPLE 4

Preparation of a Mo on silica catalyst having an egg-yolk Mo distribution by first impregnating the silica support with the aqueous Mo solution and subsequently introducing the $N_2H_4$ solution into the reaction medium 25 G of silica spheres were soaked in 75 ml of an aqueou Mo solution having a pH-8.7 and a Mo content-0.1 g Mo/ml and having been cooled to 0° C. Subsequently 20 ml of an aqueous, neutralized $N_2H_4$ solution (pH=8.5, $N_2H_4$ content=35 % w, T=0° C.) was added. The temperature of the resulting mixture was increased from 0° C. to 60° C. at a rate of 3° C./h while rotating the mixture in a round bottom flask. After 20 hours, the silica spheres were separated by filtration, washed with water and dried at 120° C. in air.

Figure 6:
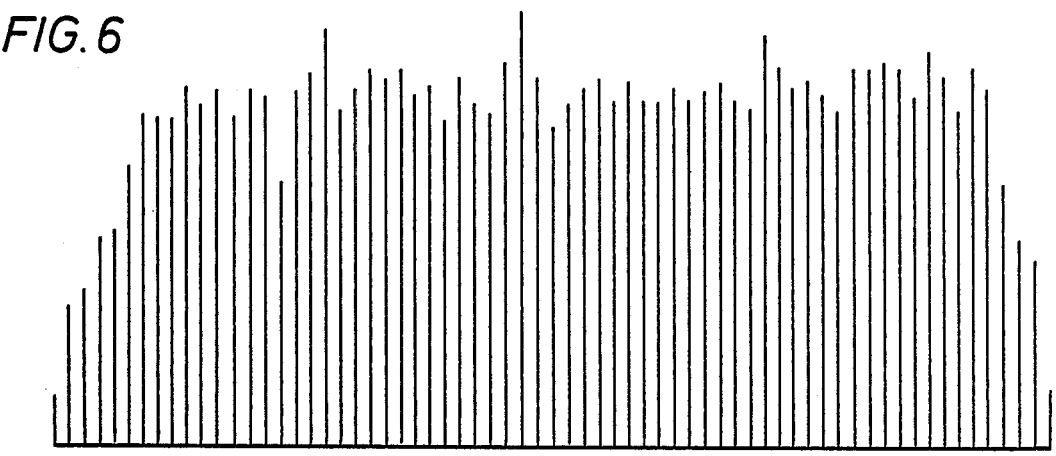

XRF indicated the catalyst to contain 16 % w Mo and with EPM the Mo-distribution was determined as depicted in FIG. 6.

EXAMPLE 5

Preparation of a Cu on gamma-alumina catalyst having an egg-yolk distribution

Preparation of $N_2H_4$-solution (Solution I)

107 Ml of $N_2H_4OH$ was diluted with 50 ml water. The pH of the solution was brought down to 8.72 by a slow and dropwise addition of concentrated acetic acid (approximately 59 ml).

Preparation of Cu-solution (Solution II)

95.06 G of $Cu(NO_3)_2.3H_2O$ was dissolved in 480 ml water. By a slow and dropwise addition of concentrated $HNo_3$, the pH of the solution was brought down to 2.0. The volume of the solution was made up to 500 ml, by the addition of water.

Catalyst preparation 4.2 Ml of Solution I was added to 60 ml of Solution II. As a result of which, under a simultaneously evolvement of one or more gaseous compounds, the reactor contents gradually turned into a green liquid phase and an orange-red precipitate. After standing for approximately 1½ hrs., the precipitate was removed by filtration and the pH of the filtrate was found to be 2.09. Subsequently 10.0 g of gamma-$Al_2O_3$ extrudate was added, whereupon again a gaseous phase was evolved while the extrudate became orange-red, via an intermediate blue phase. After 2 hours, the pH of the liquid phase was 2.43. The extrudate was separated by decantation, washed with water and dried in air at 120° C.

Figure 7:
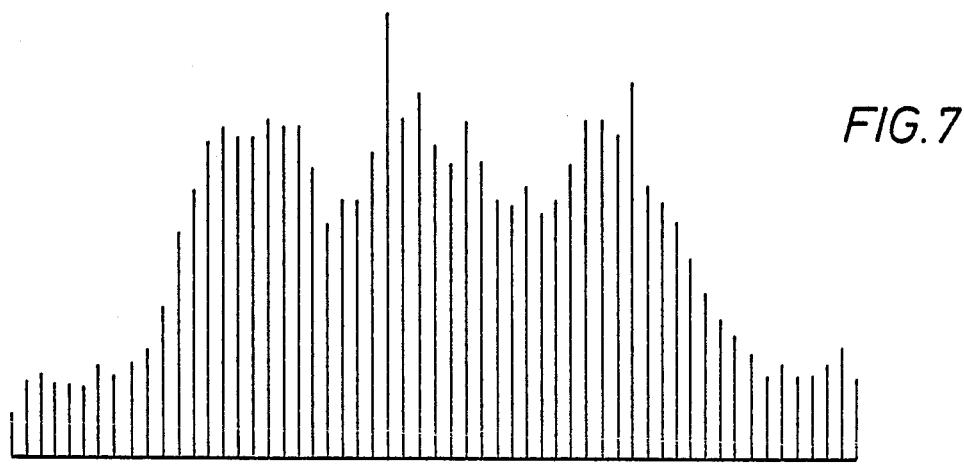

XRF indicated the catalyst to contain 1.8 % w Cu, while with EPM the Cu-distribution was determined as depicted in FIG. 7.

EXAMPLE 6

Preparation of an Ag on silica catalyst having an egg-shell Ag distribution 0.325 G of $AgNO_3$ was dissolved in 250 ml water. Next, 0.4 ml concentrated $NH_4OH$ and 10 g of silica granules were added and the mixture was cooled 2° C., whereupon 0.79 g of formaldehyde solution was added. With stirring and simultaneously bubbling nitrogen through, temperature of the mixture was maintained at 2° C. for another 15 minutes. Subsequently the temperature was increased to 20° C. and maintained for 2½ hours. Finally the granules were separated by filtration, washed thereafter with water, dried at 120° C. in the air.

Figure 8:

XFR indicated the catalyst to contain 1.45 % w Ag, while with EPM the Ag-distribution was determined in FIG. 8.

EXAMPLE 7

Preparation of an Ag on gamma-alumina catalyst having an egg-yolk Ag distribution Solution I: 5 g $AgNO_3$ dissolved in 75 ml water.
Solution II: 0.87 g formaldehyde solution was mixed with 25 ml water.

15 Ml of Solution I was diluted with 20 ml water and mixed with 6 ml of Solution II. After bringing the pH of said mixture down to 0.94 by the addition of concentrated $HNO_3$, 1 g gamma-alumina extrudate was added. The deposition reaction was allowed to proceed for 3 min. at 21° C. Subsequently the extrudate was separated by decantation of the liquid phase, and washed consecutively with a mixture of concentrated HNO3 and water 1/1 v/v and water, and finally dried at 120° C. in air.

Figure 9:
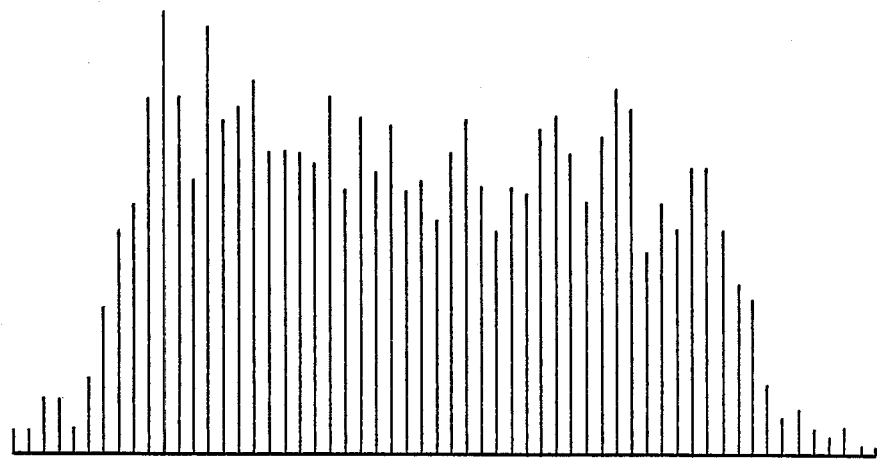

XFR indicated the catalyst to have an Ag content=0.38 % w while with EPm the Ag-distribution was determined as depicted in FIG. 9.

I claim:

1. A process for the preparation of a metal-containing supported catalyst, having the concentration of at least one metal or metal compound in the outer layer considerably lower than that in the inner portion of the catalyst comprising contacting an aqueous solution of an appropriate metal compound with a reducing agent or an oxidizing agent resulting in a redox reaction either (a) generating hydrogen ions during contact with a basic reacting preshaped support or (b) generating hydroxyl ions during contact with an acidic reacting preshaped support.

2. The process according to claim 1, wherein the metal compound is contacted with a reducing agent resulting in a redox reaction generating hydroxyl ions during contact with an acidic reacting support.

3. The process according to claim 1, wherein the metal compound is contacted with a reducing agent resulting in a redox reaction generating hydrogen ions during contact with a basic reacting support.

4. The process according to claim 1, wherein the metal compound is contacted with an oxidizing agent resulting in a redox reaction generating hydroxyl ions during contact with an acidic reacting support.

5. The process according to claim 1, wherein the metal compound is contacted with an oxidizing agent resulting in a redox reaction generating hydrogen ions during contact with a basic reacting support.

6. The process as in any one of the claims 1-5 wherein the preshaped support is based on one or more of the compounds selected from the group consisting of one or more refractory oxides, and zeolite materials.

7. The process as in any of the claims 1-5, wherein the preshaped support comprises a material selected from the group consisting of:
(a) a refractory oxide selected from the group consisting of $SiO_2$, gamma-$Al_2O_3$, eta-$Al_2O_3$, $ZrO_2$, $Cr_2O_3$, MgO, $TiO_2$, $ThO_2$ and mixtures thereof;
(b) a zeolite material selected from the group consisting of faujasite, mordenite, ZSM-5, ferrierite, and mixtures thereof;
(c) aluminum-phosphate; and
(d) mixtures of (a), (b) and (c).

8. A molybdenum-containing catalyst supported on silica wherein the concentration of the molybdenum or molybdenum compound in the outer layer is considerably lower than that in the inner portion of the catalyst prepared by a process comprising contacting on aqueous solution of an appropriate molybdenum compound with $N_2H_4$ during contact with a preshaped silica support.

* * * * *